US006837362B2

United States Patent
van Wijngaarden et al.

(10) Patent No.: US 6,837,362 B2
(45) Date of Patent: Jan. 4, 2005

(54) SINGULATOR

(75) Inventors: Erik van Wijngaarden, Hengelo (NL); Tom Delfos, Delft (NL)

(73) Assignee: FPS Food Processing Systems B.V. (NL)

( * ) Notice: Subject to any disclaimer, the term of this patent is extended or adjusted under 35 U.S.C. 154(b) by 35 days.

(21) Appl. No.: 10/361,864

(22) Filed: Feb. 11, 2003

(65) Prior Publication Data

US 2003/0178285 A1 Sep. 25, 2003

(30) Foreign Application Priority Data

Feb. 11, 2002 (EP) ............................................. 02075510

(51) Int. Cl.[7] .............................................. B65G 47/12
(52) U.S. Cl. ...................... 198/443; 198/448; 198/450
(58) Field of Search ................................ 198/443, 450, 198/448

(56) References Cited

U.S. PATENT DOCUMENTS

| | | | | |
|---|---|---|---|---|
| 1,451,450 A | * | 4/1923 | Smith | 414/416.04 |
| 1,744,363 A | * | 1/1930 | Chapman | 414/416.09 |
| 3,288,265 A | * | 11/1966 | Smith | 198/443 |
| 3,522,873 A | * | 8/1970 | Wallace | 198/443 |
| 3,628,648 A | * | 12/1971 | McClusky | 198/383 |
| 3,633,728 A | * | 1/1972 | Chamberlin | 198/448 |
| 4,294,691 A | * | 10/1981 | Patzlaff | 209/3.1 |
| 4,542,687 A | | 9/1985 | Johnson | |
| 4,932,513 A | * | 6/1990 | Michimae et al. | 198/397.6 |

FOREIGN PATENT DOCUMENTS

| | | |
|---|---|---|
| GB | 1198932 | 7/1970 |
| WO | WO 00/05159 | 2/2000 |

* cited by examiner

*Primary Examiner*—Richard Ridley
(74) *Attorney, Agent, or Firm*—Stites & Harbison PLLC; Marvin Petry

(57) ABSTRACT

An apparatus is provided for singulating products, such as apples, which, floating along in water in a channel in the transport direction, are supplied and, after singulation in the water, are thereupon fed out of the water to a transport device, for instance a roller conveyor. The apparatus includes a submerging device for submerging products supplied in the channel, a singulating channel, of a width equal to the singulating width, intended for collecting the products released after submersion, in a continuous row, and a releasing device for releasing the products after the submersion and for thereupon feeding the products to the singulating channel. With such an apparatus, a high degree of filling for the following transport device, generally functioning as a first part of a sorting device, can be obtained.

11 Claims, 4 Drawing Sheets

SINGULATOR

Figure 1:
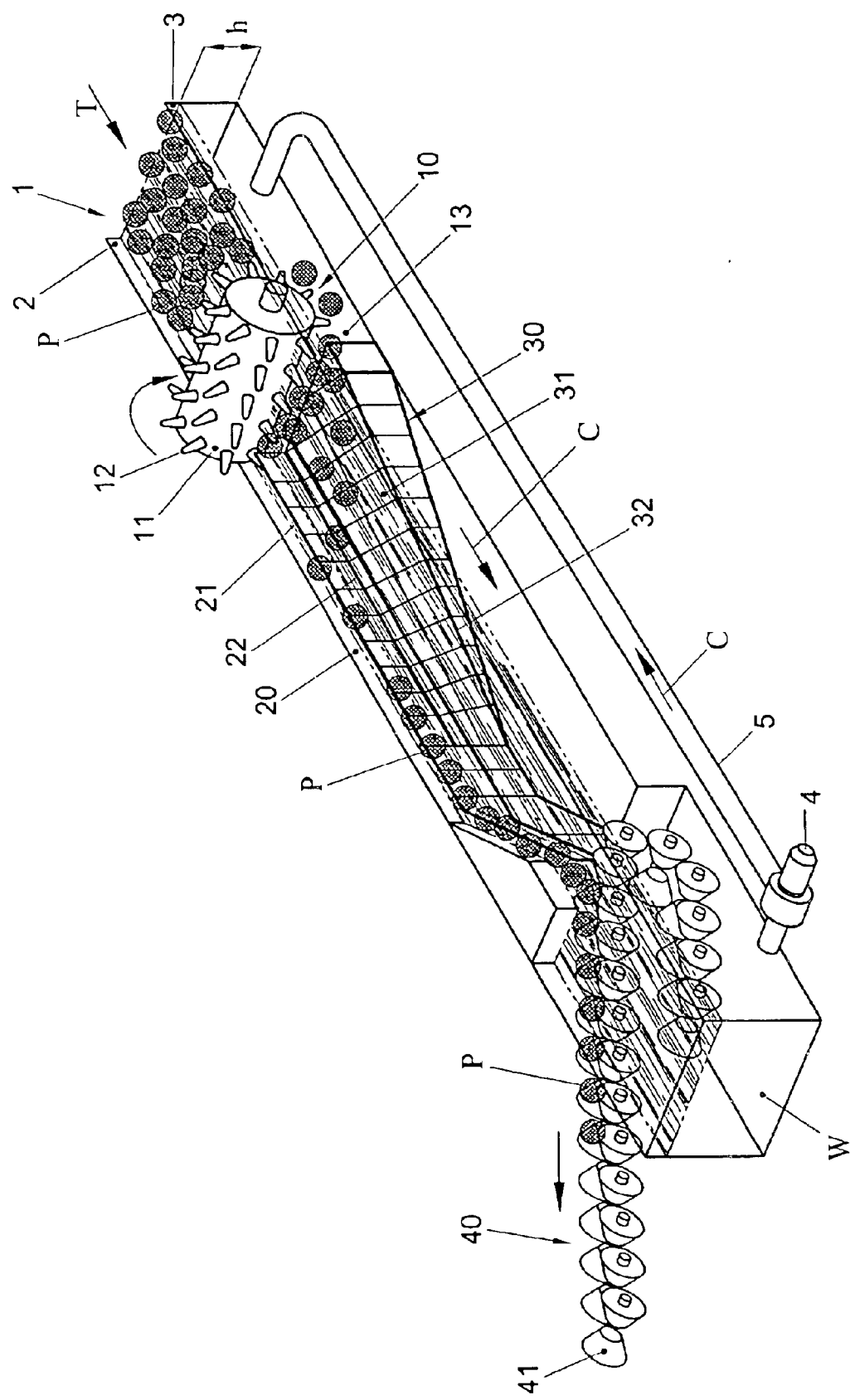

The invention relates to an apparatus and a method for singulating products supplied in a stream, as indicated in the preamble of claim 1 and claim 10, respectively.

Such a method and apparatus are known from WO 00/05159. This publication discloses an arrangement which comprises, between the supply stream in the channel and the roller conveyor which, adjacent the liquid surface, takes over the fruits from the liquid, for each singulating row two juxtaposed parallel running conveyors having at each outer side slightly upstanding edges, the conveyors starting approximately horizontally under the water surface and converging upwards in a V-shape to a particular singulation width.

In this singulator, the singulating operation takes place for a considerable part above the water surface. This will certainly also result in products damming up between the converging belts and hence cause damage to a certain number of products.

A more important shortcoming of this apparatus is considered to be the insufficient degree of filling due to the travel of the two conveyors and the products being carried along whilst floating. Precisely at the time of being carried along, the products will start dancing and rotating in the water and thus pass up the opportunity to take up a position on the roller conveyor emerging from the water.

To improve the singulation mentioned, the invention provides an apparatus, characterized in that the apparatus comprises, in succession a submerging device for submerging the products supplied in the channel;

a singulating channel, of a width equal to the singulating width, intended for collecting products, released after submersion, in a continuous row, and a releasing device for releasing the products after submersion and for then feeding the products to the singulating channel.

The method according to the present invention is characterized in that singulation comprises the successive steps of:

submerging the products in the liquid;

releasing the submerged products gradually one after the other, with the products in the liquid stream being grouped, floating, in a continuous row, and taking over of the row of products by the transport device.

With this apparatus and method, with great advantage, a row of buffered products is formed which will be carried along in a very gradual manner from the liquid stream, whereby a high degree of filling is obtained for the following transport device.

Figure 2:
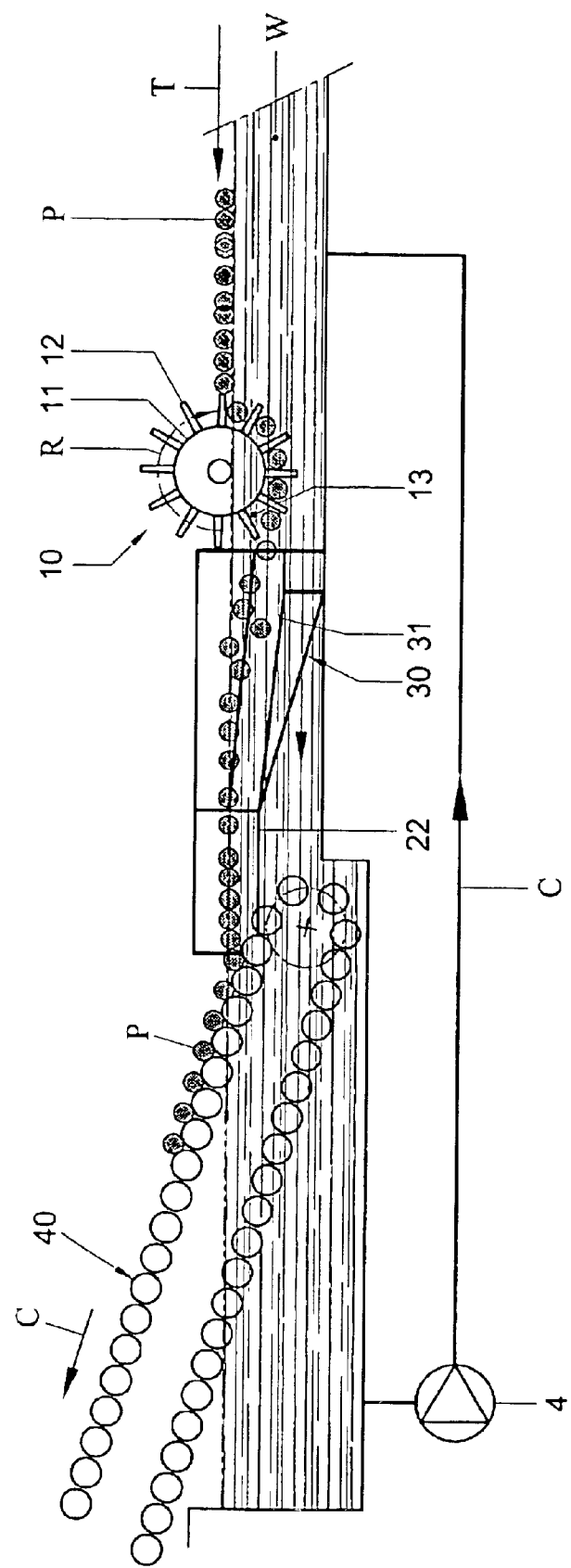
Figure 3:
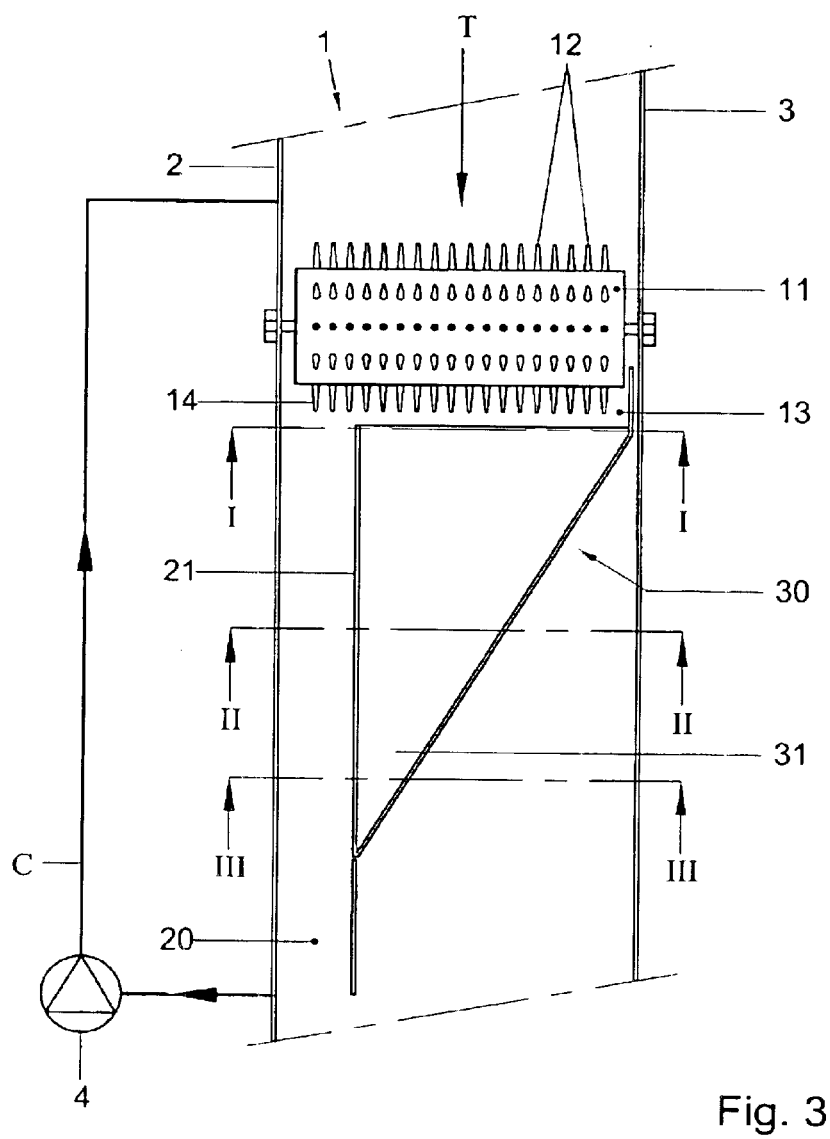
Figure 4A:
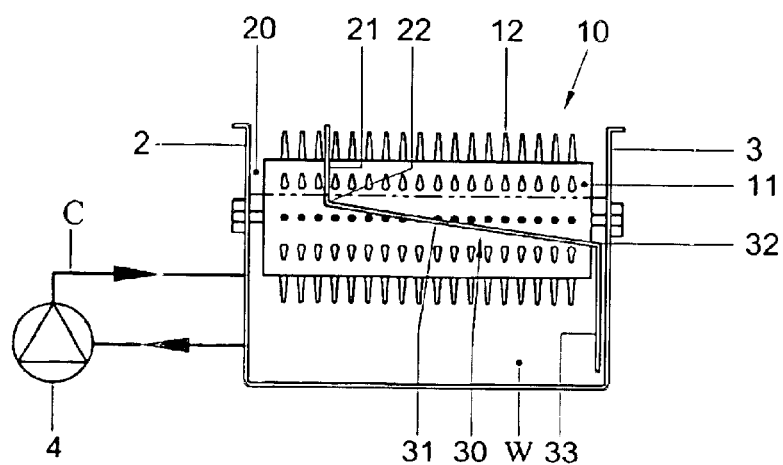
Figure 4B:
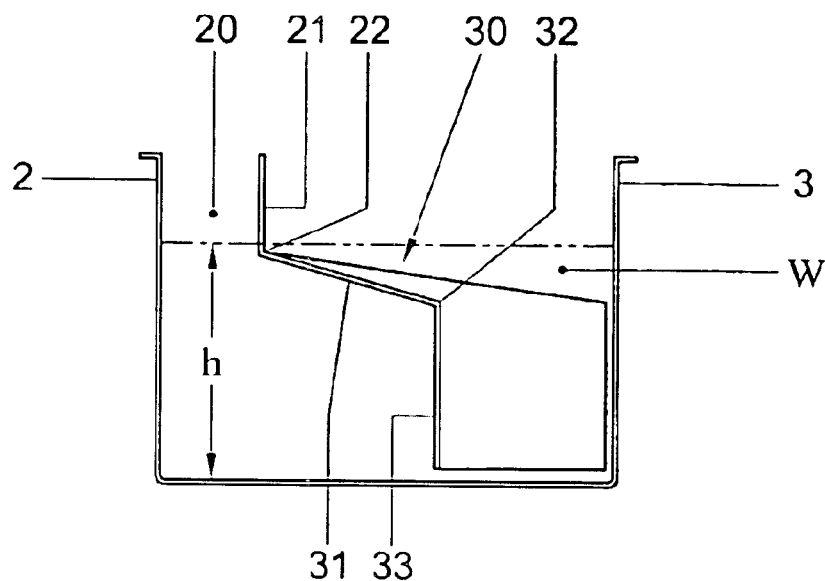
Figure 4C:
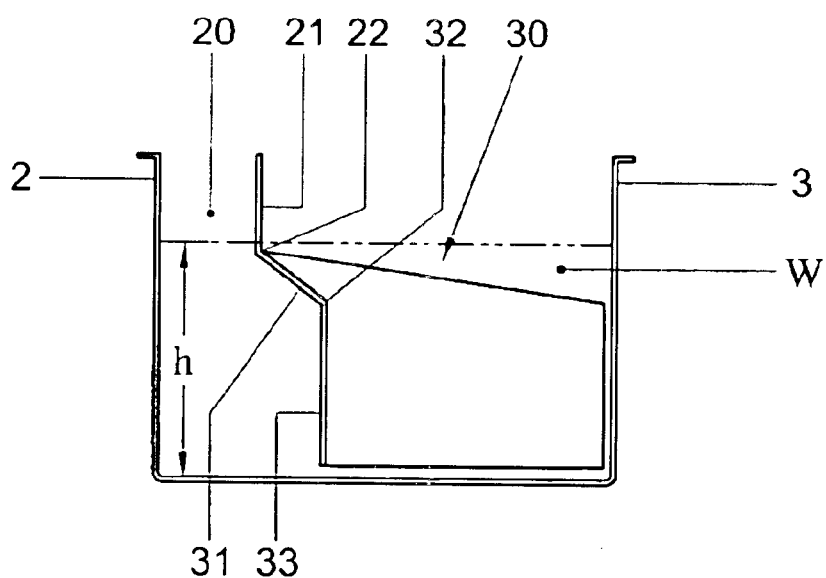

Further embodiments and details of the present invention will be elucidated in more detail with reference to the drawing. In the drawing:

FIG. 1 schematically shows a perspective view of an embodiment according to the invention;

FIG. 2 schematically shows a side view of a cross section along the transport direction of the embodiment according to FIG. 1;

FIG. 3 shows a top plan view of a part of the embodiment according to FIG. 1; and FIGS. 4A, 4B and 4C show cross sectional views of FIG. 3 along the planes I, II and III, respectively In the different Figures, the same parts have the same reference numerals.

Referring to FIGS. 1 and 2, there is shown a first embodiment of the apparatus according to the present invention, wherein products P, such as apples, are floatingly supplied in a liquid stream W in transport direction T in a channel 1 to, successively, a submerging device 10, a releasing device 30, and a singulating channel, thereby to be singulated and then to be carried along by a transport device 40. More in particular, the channel 1 has a tray-shaped cross section, with two side walls, one side wall 2 and the other side wall 3, in which liquid, such as water W, having a depth h, is circulated with a circulating pump 4 and via a circulation duct 5 into the channel in the transport direction T, also the downstream direction, or also direction of circulation c.

First of all, the products P reach the submerging device 10 which is formed by a pinned roller 11 with pins 12 and a comb 13. This pinned roller 11 extends transversely to the transport direction T, between the two side walls. On the roller, pins 12 are disposed, extending radially from the surface of the roller. The intermediate distances between the pins is smaller than the smallest diameter of a product P, so that, when the roller rotates, the products are carried along in the rotation direction R, which is such that the rotation direction below the water surface proceeds in the direction of the transport direction T, being the same as the downstream direction. To realize this, the roller must rotate in the water at least partly. The depth over which this takes places determines the submersion depth. Immediately following the pinned roller 11, a comb 13 with teeth and intermediate recesses 14 is fixedly mounted. The teeth of the comb are so disposed that, during rotation, only the pins 11 can move through the recesses 14. The comb 13 is arranged so as to slope across the width of the channel, from one side adjacent the one side wall 2 to the other side adjacent the other side wall 3, with each tooth located in a substantially horizontal plane. What is thus enabled is that not all products are submerged to an equal extent. More in particular, products adjacent the one side wall are less deeply submerged than the products adjacent the other side wall. It will be clear that the materials for the roller, pins and comb are selected such that the products are not damaged in any way. The pins, for instance, are made of a suitable plastic or rubber.

Directly following this comb, in the channel, a singulating channel 20 has been constructed, having a width equal to the singulating width, while the one side wall 2 at the same time constitutes the one side wall of the singulating channel 20, and a wall element 21 forms the other wall of this singulating channel. This wall element 21 has a lower edge 22 at a depth adjacent at least the center of the products. From this lower edge 22, the comb 13 starts, while the further sloping of the comb to the other side of the channel preferably proceeds as far as the underside of the roller.

In order to cause the products, upon being simultaneously carried along by the liquid stream and the pinned roller, to form, after the comb 13, gradually and one after the other, a continuous row in the singulating channel, the releasing device 30 comprises a baffle 31. This baffle is located upstream, across the entire width, close to the comb, and extends further between, at the one side, the lower edge 22 or the wall element 21 and, at the other side, a side edge 32. This side edge 32 proceeds, downstream, towards the wall element 21. From this side edge 32, a vertical plate part 33 extends substantially as far as the bottom of the channel 1. The angle of convergence, calculated from the other side wall 3, is preferably between 35° and 55°. The configuration of the side edge 32 may further be selected such that the baffle forms a flat plate part. It is also possible that, conversely, this lower edge 32 continues to run horizontally so that the baffle forms a curved plate part, with which the flow-through direction of the liquid, and hence the direction of conveyance of the products, is deflected in the direction of the singulating channel 20.

Connected downstream to the singulating channel is a transport device 40 carrying the products upwards one by one out of the row. Conventionally, the transport device is a so-called roller conveyor 41, with successive axes having diabolos thereon, with each pair of successive diabolos in the transport direction forming a nest for a single product P. The axes are, for instance, on both sides attached to two endless chains and thus form an endless transport device. In many cases, this transport device itself forms part of a sorting machine as is generally known in this field of the art.

It has been found that with the above-described successive devices in the singulation channel a continuous row of products is formed, to be regarded as a buffer. The products in this row lie against each other such, and the row has a length such, that a roller conveyor as described hereinabove carries along the products without unfilled nests and this manner of carrying products along hence results in a degree of filling of approximately 100%.

FIGS. 3 and 4A–4C show elevational views of the same devices, or parts thereof, as described hereinabove. What is clear to see, in particular from FIGS. 4A–4C, is the configuration of the wall element 21, the lower edge 22 and the side edge 32, the baffle 31 and the plate part 33. Also, FIG. 3 gives an impression of the configuration of the singulation channel 20 which preferably continues beyond the end of the side edge 32 in order to create a sufficiently long buffer.

In a second exemplary embodiment, an entirely different type of submerging device 40 has been chosen. To provide that, along a particular part of the length of the channel 1, the products are submerged in the liquid sufficiently deeply, along that part of the length gas is supplied from the bottom, for instance from nozzles, of from a vaporizer. The change in density arising along that part of the length, more in particular the upwardly decreasing density, results in the products coming down and floating at a particular depth. Whilst being simultaneously carried along, the products are caught downstream, in the same manner as described above, under a baffle 31. The further successive devices can be utilized in the same manner to obtain a buffer of products in a singulating channel.

It will be clear to any skilled person that through small modifications of or additions to the devices described, side effects can be avoided, or, conversely, be obtained, without thereby departing from the scope of the claims. For instance, the baffle can be formed from cloth, while the angle of convergence can be adjusted. Moreover, the plate-shaped parts will be such that the products, while being carried along, are not damaged and not hindered. For instance, a few openings in the plate parts can promote the flow-through, while gauze-shaped surfaces will rather cause the products to grate. Also, the plate parts mentioned can have in whole or in part a straight and/or curved configuration to suitably influence the flow of the liquid and the handling of the products.

What is claimed is:

1. An apparatus for singulating products, such as apples, which, floating along in liquid in a channel in a transport direction, are supplied and, after singulation in the liquid, are then fed out of the water to a transport device, the apparatus comprising:
a channel, in use to be filled with liquid to a liquid level which liquid is streaming in the transport direction to form a liquid stream, the channel having a first side and a second side;
a submerging device for submerging products supplied in the channel;
a releasing device; and
a singulating channel, of a width equal to a singulating width, intended for collecting the products released after submersion, in a continuous row,
the releasing device being arranged for releasing the products after submersion and for feeding the products to the singulating channel, the releasing device comprising a baffle which extends from the submerging device to the singulating channel and which extends below the liquid level, the baffle being positioned such that the submerged products are gradually released one after another into the singulating channel, with the products being grouped in the liquid stream, floating, in a continuous row, a transport device extending in the singulating channel for removing the products out of the singulating channel.

2. The apparatus according to claim 1, wherein the singulating channel is located on the first side of the channel, while a side wall of said first side also forms a side wall of the singulating channel, while another side of the singulating channel is a wall element, with a lower edge at at least a depth adjacent at least the center of the products.

3. The apparatus according to claim 1, wherein the submerging device comprises a gas supply element disposed adjacent the bottom of the channel.

4. The apparatus according to claim 3, wherein the gas supply element comprises spray nozzles.

5. The apparatus according to claim 1, wherein the releasing device, in a transverse direction which is perpendicular to the transport direction, from the first side to the second side of the channel releases the submerged products, while the depth to which the products have been submerged increases gradually in the transverse direction towards the second side of the channel.

6. The apparatus according to claim 1, wherein the submerging device comprises:
a pinned roller having an axis of rotation which extends transverse to the transport direction and having the width of the channel, which pinned roller rotates, at least for a part of the lower half, in the water, the pins extending radially from the roller and, in a direction parallel to the liquid surface, having an intermediate distance smaller than the smallest diameter of a product, while, for the purpose of carrying along the products, the direction of rotation in the water extends substantially in the transport direction; and
a comb with teeth, downstream of the pinned roller, sloping across the width of the channel, away from the first side from just below the water surface to the second side, as far as the underside of the roller, having, between the teeth, recesses for the pins.

7. The apparatus according to claim 2, wherein a first side of the baffle of the releasing device is connected with said lower edge of the singulating channel, an upstream end of the baffle being connected to and having the width of the comb, a second side edge, which is opposite the first side edge, viewing from an upstream end to a downstream end of the baffle, virtually immediately after the comb converges from the second side wall downstream to the wall element, while a plate part is connected to this second side edge, which plate part extends downwards substantially as far as a bottom of the channel.

8. The apparatus according to claim 7, wherein the comb and the baffle constitute a flat plane.

9. The apparatus according to claim 7, wherein the comb and the baffle constitute a curved plane, with the first side edge extending horizontally in downstream direction.

10. A method for singulating floating products, such as apples, supplied with a liquid stream, and thereupon, with the liquid stream, fed to a transport device, said method comprising:

submerging the products in the liquid;

releasing the submerged products gradually one after another, with the products being grouped in the liquid stream, floating, in a continuous row; and taking over of the row of products by the transport device.

11. The apparatus according to claim 2, wherein a first side of the baffle of the releasing device is connected with said lower edge of the singulating channel, an upstream end of the baffle being connected to and having the width of the comb, a second side edge, which is opposite the first side edge, viewing from an upstream end to a downstream end of the baffle, virtually immediately after the comb converges from the second side wall downstream to the wall element, while a plate part is connected to this second side edge, which plate part extends downwards substantially as far as a bottom of the channel.

* * * * *